(12) United States Patent
Wall et al.

(10) Patent No.: US 11,996,636 B1
(45) Date of Patent: May 28, 2024

(54) ANTENNA LOADED WITH ELECTROMECHANICAL RESONATORS

(71) Applicant: HRL Laboratories, LLC, Malibu, CA (US)

(72) Inventors: Walter S. Wall, Santa Monica, CA (US); Hyok J. Song, Oak Park, CA (US); Randall L. Kubena, Oak Park, CA (US); Carson R White, Agoura Hills, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 261 days.

(21) Appl. No.: 17/459,891

(22) Filed: Aug. 27, 2021

Related U.S. Application Data

(62) Division of application No. 15/638,052, filed on Jun. 29, 2017, now Pat. No. 11,145,982.

(Continued)

(51) Int. Cl.
*H01Q 9/04* (2006.01)
*H01Q 1/34* (2006.01)
(Continued)

(52) U.S. Cl.
CPC .............. *H01Q 9/0442* (2013.01); *H01Q 1/34* (2013.01); *H01Q 1/36* (2013.01); *H01Q 5/357* (2015.01);
(Continued)

(58) Field of Classification Search
CPC .......... H01Q 1/50; H01Q 1/521; H01Q 21/28; H01Q 9/145; H01Q 1/2291; H01Q 1/243;
(Continued)

(56) References Cited

U.S. PATENT DOCUMENTS

| 3,445,849 A | 5/1969 | Sanford |
| 4,501,018 A | 2/1985 | Shanley |

(Continued)

FOREIGN PATENT DOCUMENTS

| CN | 1640084 | 7/2005 |
| CN | 101151766 | 3/2008 |

(Continued)

OTHER PUBLICATIONS

Stephen E. Sussman-Fort et al., Non-Foster Impedance Matching of Electrically-Small Antennas, IEEE Transactions on Antennas and Propagation, vol. 57, No. 8, Aug. 2009.

(Continued)

*Primary Examiner* — Monica C King
(74) *Attorney, Agent, or Firm* — Ladas & Parry, LLP

(57) ABSTRACT

An antenna system having at least one active element with a first end thereof for connection to a radio receiver, transmitter or transceiver and at least one electromechanical resonator connected in series with (i) at least portion of said at least one active element and at least another portion of said at least one active element or (ii) said at least one active element and said radio receiver, transmitter or transceiver. The at least one active element exhibits capacitive reactance at an intended frequency of operation and the at least one electromechanical resonator exhibits inductive reactance at the intended frequency of operation, the inductive reactance of the at least one electromechanical resonator offsetting or partially offsetting the capacitive reactance of the at least one antenna element at the intended frequency of operation.

15 Claims, 14 Drawing Sheets

Related U.S. Application Data

(60) Provisional application No. 62/356,734, filed on Jun. 30, 2016.

(51) Int. Cl.
*H01Q 1/36* (2006.01)
*H01Q 5/357* (2015.01)
*H01Q 9/06* (2006.01)
*H01Q 9/16* (2006.01)
*H01Q 9/30* (2006.01)
*H01Q 13/10* (2006.01)
*H01Q 13/18* (2006.01)
*H01Q 23/00* (2006.01)

(52) U.S. Cl.
CPC ........... *H01Q 9/0421* (2013.01); *H01Q 9/065* (2013.01); *H01Q 9/16* (2013.01); *H01Q 9/30* (2013.01); *H01Q 13/106* (2013.01); *H01Q 13/18* (2013.01); *H01Q 23/00* (2013.01)

(58) Field of Classification Search
CPC ........ H01Q 1/38; H01Q 13/10; H01Q 13/103; H01Q 21/00; H01Q 21/0006; H01Q 21/12; H01Q 21/29; H01Q 3/24; H01Q 3/34; H01Q 5/00; H01Q 5/22; H01Q 5/371; H01Q 5/40; H01Q 5/48; H01Q 9/04; H01Q 9/0442; H01Q 9/16; H01Q 9/28; H01Q 9/40; H01Q 9/42; H01Q 21/30; H03J 2200/15; H03J 5/0245; H03J 5/242; H03J 5/244; H04B 1/0053; H04B 1/38; H04B 1/401; H04B 7/024; H04B 7/0404; H04B 7/0413; H04B 7/0417; H04B 7/0608; H04B 7/0628; H04B 7/0632; H04B 7/0691
See application file for complete search history.

(56) References Cited

U.S. PATENT DOCUMENTS

| | | | |
|---|---|---|---|
| 5,489,914 A | 2/1996 | Breed | |
| 5,705,879 A | 1/1998 | Abe | |
| 5,801,661 A | 9/1998 | Suzuki | |
| 7,154,938 B2 | 12/2006 | Cumeralto | |
| 7,486,002 B2 | 2/2009 | Pulskamp | |
| 7,573,350 B2 | 8/2009 | Frank | |
| 7,738,840 B2 | 6/2010 | Rofougaran | |
| 8,125,399 B2 | 2/2012 | McKinzie | |
| 8,958,766 B2 | 2/2015 | Ungan et al. | |
| 9,054,798 B2 | 6/2015 | Xu et al. | |
| 9,362,619 B2* | 6/2016 | Montgomery | H01Q 1/38 |
| 9,368,869 B2* | 6/2016 | Chen | H04W 24/08 |
| 9,413,065 B2* | 8/2016 | Caimi | G01R 23/02 |
| 9,444,139 B2* | 9/2016 | Montgomery | H01Q 1/38 |
| 9,478,856 B2* | 10/2016 | Marshall | H01Q 13/10 |
| 9,496,609 B2* | 11/2016 | Marshall | H04B 7/0608 |
| 9,627,753 B2* | 4/2017 | Caimi | H01Q 21/12 |
| 9,680,220 B2* | 6/2017 | Rabe | H01Q 9/40 |
| 9,692,124 B2* | 6/2017 | Caimi | H01Q 13/10 |
| 9,912,319 B2 | 3/2018 | Nakai | |
| 10,096,910 B2* | 10/2018 | Chen, III | H01Q 21/28 |
| 10,212,657 B2 | 2/2019 | Wiser | |
| 10,727,570 B2* | 7/2020 | Paulotto | H01Q 9/0414 |
| 11,145,982 B2 | 10/2021 | Wall | |
| 11,165,139 B1* | 11/2021 | Paulotto | H01Q 15/0026 |
| 2004/0135675 A1 | 7/2004 | Thiesen | |
| 2004/0227585 A1 | 11/2004 | Taniguchi | |
| 2004/0227586 A1 | 11/2004 | Taniguchi | |
| 2005/0174192 A1 | 8/2005 | Kawamura | |
| 2008/0042819 A1 | 2/2008 | Masudaya | |
| 2008/0197943 A1 | 8/2008 | Xu | |
| 2008/0224568 A1 | 9/2008 | Kvisteroy | |
| 2010/0291946 A1 | 11/2010 | Yamakawa | |
| 2011/0090026 A1 | 4/2011 | Nakahashi | |
| 2012/0126913 A1 | 5/2012 | Hara | |
| 2012/0182092 A1 | 7/2012 | Yokoyama | |
| 2012/0229307 A1 | 9/2012 | Tsai | |
| 2013/0130631 A1 | 5/2013 | Song | |
| 2013/0130636 A1 | 5/2013 | Ungan | |
| 2013/0321093 A1 | 12/2013 | Ueda | |
| 2013/0335280 A1* | 12/2013 | Chen, III | H01Q 21/30 343/745 |
| 2015/0002355 A1* | 1/2015 | Yan | H01Q 1/2283 343/893 |
| 2015/0116153 A1* | 4/2015 | Chen | G01R 29/0807 342/359 |
| 2015/0116159 A1* | 4/2015 | Chen | H01Q 9/145 343/702 |
| 2015/0116161 A1* | 4/2015 | Caimi | H04W 72/0453 343/703 |
| 2015/0116162 A1* | 4/2015 | Caimi | H01Q 9/16 343/703 |
| 2015/0116163 A1* | 4/2015 | Caimi | G01R 25/00 343/703 |
| 2015/0116170 A1* | 4/2015 | Caimi | H01Q 13/10 343/750 |
| 2015/0117219 A1* | 4/2015 | Marshall | H01Q 9/40 370/236 |
| 2015/0117334 A1* | 4/2015 | Rabe | H04B 7/0628 370/329 |
| 2015/0117358 A1* | 4/2015 | Marshall | H01Q 9/0442 370/329 |
| 2015/0117415 A1* | 4/2015 | Rabe | G01R 29/0807 370/334 |
| 2015/0117502 A1* | 4/2015 | Chen | H01Q 9/0442 343/702 |
| 2015/0117560 A1* | 4/2015 | Caimi | G01C 21/20 343/893 |
| 2015/0118972 A1* | 4/2015 | Montgomery | H01Q 5/371 455/75 |
| 2015/0118973 A1* | 4/2015 | Montgomery | H04W 4/026 455/75 |
| 2015/0118974 A1* | 4/2015 | Montgomery | H01Q 21/28 455/75 |
| 2015/0119045 A1* | 4/2015 | Montgomery | H04W 4/026 455/562.1 |
| 2015/0119052 A1* | 4/2015 | Caimi | H01Q 5/371 455/552.1 |
| 2015/0120189 A1* | 4/2015 | Giometti | H01Q 9/40 342/450 |
| 2015/0137908 A1 | 5/2015 | Nishihara | |
| 2015/0333401 A1 | 11/2015 | Maruthamuthu | |
| 2016/0191014 A1 | 6/2016 | Khlat | |
| 2016/0248155 A1* | 8/2016 | Montgomery | H01Q 9/04 |
| 2016/0352310 A1 | 12/2016 | Tani | |
| 2017/0040670 A1* | 2/2017 | Chen | H01Q 1/38 |
| 2017/0054431 A1 | 2/2017 | Shimomura | |
| 2017/0099041 A1 | 4/2017 | Wall | |
| 2018/0198211 A1 | 7/2018 | Wall | |
| 2018/0226720 A1 | 8/2018 | Wall | |
| 2020/0136234 A1* | 4/2020 | Paulotto | H01Q 15/0026 |
| 2021/0328327 A1* | 10/2021 | Paulotto | H01Q 9/0414 |

FOREIGN PATENT DOCUMENTS

| | | |
|---|---|---|
| CN | 101304120 | 11/2008 |
| CN | 102576937 A | 7/2012 |
| CN | 104471864 | 3/2015 |
| CN | 105897280 | 8/2016 |
| CN | 106711581 | 5/2017 |
| DE | 2836608 | 3/1980 |
| EP | 2819242 | 12/2014 |
| EP | 3649739 | 5/2020 |
| JP | S60 85603 | 5/1985 |
| JP | 2005-260382 | 9/2005 |
| JP | 2011-128956 | 6/2011 |
| KR | 10-2005-0048164 | 5/2005 |
| WO | 03/077489 | 9/2003 |

(56) References Cited

FOREIGN PATENT DOCUMENTS

| WO | 2015-095573 | 6/2015 |
|---|---|---|
| WO | 2016-081894 | 5/2016 |
| WO | 2019/005251 | 1/2019 |

OTHER PUBLICATIONS

Antwi Nimo et al., "A New Family of Passive Wireless RF Harvesters based on R-C-Quartz Oscillators", Proceedings of the 43rd European Microwave Conference, Oct. 2013.
R. C. Hansen, "Efficiency and Matching Tradeoffs for Inductively Loaded Short Antennas", IEEE Transactions on Communications, vol. Com-23, No. 4, Apr. 1975.
U.S. Appl. No. 17/530,303, filed Nov. 18, 2021, Wall.
From U.S. Appl. No. 15/638,052 (now U.S. Pat. No. 11,145,982), Corrected Notice of Allowability dated Jun. 24, 2021.
From U.S. Appl. No. 15/638,052 (now U.S. Pat. No. 11,145,982), Notice of Allowance dated Jun. 14, 2021.
From U.S. Appl. No. 15/638,052 (now U.S. Pat. No. 11,145,982), Office Action dated Mar. 2, 2021.
From U.S. Appl. No. 15/638,052 (now U.S. Pat. No. 11,145,982), Office Action dated Jul. 24, 2020.
From U.S. Appl. No. 15/638,052 (now U.S. Pat. No. 11,145,982), Office Action dated Jan. 23, 2020.
From U.S. Appl. No. 15/638,052 (now U.S. Pat. No. 11,145,982), Office Action dated Jul. 5, 2019.
From U.S. Appl. No. 15/638,052 (now U.S. Pat. No. 11,145,982), Office Action dated Apr. 5, 2019.
PCT International Preliminary Report on Patentability (Chapter I) with Written Opinion from PCT/US2018/025596 dated Jan. 9, 2020.
PCT International Preliminary Report on Patentability (Chapter I) with Written Opinion from PCT/US2018/025595 dated Jan. 9, 2020.
Office action from Chinese Patent Application No. 201880040832.2 dated Jul. 30, 2021, and its brief English translation.
From U.S. Appl. No. 15/942,435 (now published as US 2018-0226720 A1), Notice of Allowance dated Sep. 14, 2021.
From U.S. Appl. No. 15/942,435 (now published as US 2018-0226720 A1), Notice of Allowance dated Aug. 31, 2021.
Office action from Chinese Patent Application No. 201880039305.X dated Nov. 25, 2021, and its brief English translation.
PCT International Search Report and Written Opinion from PCT/US2018/025596 dated Jul. 17, 2018.
PCT International Search Report and Written Opinion from PCT/US2018/025595 dated Jul. 26, 2018.
Extended European Search Report from EPO Patent Application No. 18825364.5 dated Nov. 13, 2020.
Extended European Search Report from EPO Patent Application No. 18822769.8 dated Feb. 24, 2021.
Office action from Chinese Patent Application No. 201880040832.2 dated Mar. 4, 2021 with search report, and its English translation.
From U.S. Appl. No. 15/942,435 (now published as US 2018-0226720 A1), Office Action dated Mar. 31, 2021.
From U.S. Appl. No. 15/942,435 (now published as US 2018-0226720 A1), Office action dated Jul. 9, 2020.
Office action from European Patent Application No. 18822769.8 dated Apr. 4, 2022.
Office action from Chinese Patent Application No. 201880039305.X dated Jul. 4, 2022 with its English translation and search report.
From U.S. Appl. No. 17/530,303 (now published as US 2022-0077588 A1), Office Action dated Sep. 20, 2023.

* cited by examiner

ANTENNA LOADED WITH ELECTROMECHANICAL RESONATORS

CROSS REFERENCE TO RELATED APPLICATIONS

This application is a divisional of U.S. patent Application Ser. No. 15/638,052, filed Jun. 29, 2017, which claims the benefit of U.S. Provisional Patent Application Ser. No. 62/356,734 filed Jun. 30, 2016 and entitled "Antenna Loaded with Electromechanical Resonators", the disclosures of which are hereby incorporated herein by reference.

STATEMENT REGARDING FEDERALLY SPONSORED RESEARCH OR DEVELOPMENT

None.

TECHNICAL FIELD

Improvement of the efficiency of electrically small antennas.

BACKGROUND

Techniques for improving the efficiency of electrically small antennas have existed for many years, however these techniques have relied one several different schemes to counteract the capitative reactance exhibited by an electrically short antenna. One technique relies heavily on the use of inductors, such as traditional coiled inductors. to load the antenna structure. Another technique suggests the use of negative capacitors. See, for example, Stephen E. Sussman-Fort and Ronald M. Rudish, "Non-Foster Impedance Matching of Electrically Small Antennas", IEEE Transactions on Antennas and Propagation, vol. 57, No. 8, August 2009, pp. 2230-2241 and U.S. Pat. No. 9,054,798 entitled "Non-foster Circuit Stabilization Method" by Xu et. al. Due to losses and size/weight constraints, traditional coiled inductors are limited in their achievable quality factor. The proposed invention surpasses these previous demonstrations by using electromechanical resonators off-resonance to achieve higher quality factors and thus improve the efficiency of electrically small antennas.

U.S. Pat. No. 8,958,766 by Tolgay Ungan and a paper A. Nimo, D. Grgid, Tolgay Ungan, and Leonhard M. Reindl (see "A New Family of Passive Wireless RF Harvesters based on R-C-Quartz Oscillators" published in the *Proceedings of the 43$^{rd}$ European Microwave Conference* 2013) propose the use of quartz resonators as effective high Q inductors to transform the impedance of a 50Ω antenna to the impedance of a rectifying circuit. However, this patent makes no mention of using these resonators to match the reactance of an electrically small antenna or to load the body of an antenna for the purpose of increasing radiation resistance. This patent also does not mention the use of parasitic antennas or distributed loading with electromechanical resonators to allow for higher power operation.

Many locations, such as dense urban areas, forests, and underwater environments present significant challenges for the reception and transmission of wireless signals. Low frequency electromagnetic waves (<30 MHz) are more efficient than their high frequency (>1 GHz) counterparts at penetrating these difficult environments but the systems required to generate and receive these waves are often large, heavy, and inefficient, making them impractical for many small and/or mobile platforms. In the case of systems operating at or below the HF frequency band (3-30 MHz), the root cause of the large size and inefficiency of these systems is the size of the antenna relative to the wavelength. At very low frequencies, it is difficult, if not impractical, to build antennas which are on the order of the radiating wavelength. This design limitation causes these antennas to be electrically small and in the case of dipole antennas have large reactances and small radiation resistances. One technique to improve the radiation efficiency of these antennas is to place inductors in the arms of an electrically small dipole. See R. C. Hansen, "Efficiency and Matching Tradeoffs for Inductively Loaded Short Antennas" *IEEE Transactions on Communications*, Vol. Com-23, No. 4, April 1975. This loading not only cancels the reactance of the antenna but also increases the radiation resistance of the antenna by redistributing and increasing the current distribution on the dipole. The effectiveness of this loading is directly related to the quality factor or Q of the inductors. These inductors typically comprise thin metallic wires coiled around high permeability materials, such as iron or ferrites. Due to ohmic losses as well as size and weight constraints, Q values for compact inductors typically do not exceed 100. Alternatively electromechanical resonators can be operated between their series and parallel resonances to present an impedance which appears inductive with a very high Q ($>10^3$), however due to heating and nonlinear effects these devices are limited in how much power they can handle previously confining their application to receive only systems.

A purpose of some embodiments is to utilize the high effective inductive Q present in electromechanical resonators to load electrically small dipole antennas or arrays of antennas to improve efficiency beyond what is achievable with conventional compact inductors, while allowing for high power handling. While large inductor Q's (1000-2000) and high power handling are achievable below 100 kHz using Utz wire inductors, these elements are too large to be loaded into compact antennas. Alternatively the proposed invention utilizes compact electromechanical resonators (preferably <1 cm$^2$) to achieve large inductor Q's (preferably $>10^3$) and enable compact and efficient low frequency antennas for small and mobile platforms.

In one application this invention can be leveraged to create efficient transceivers at VLF and LF frequencies for submerged platforms and sensors. This may be useful for exfiltration of data collected from autonomous underwater vehicles and sensor networks. This invention can also be leveraged at higher frequencies to reduce the size, weight and power of tactical 2-way communications at HF and VHF frequencies. This can be of particular interest to the military. The proposed invention also has dual use in the commercial sector. For example, the proposed antenna structure could be leveraged at VLF and LF frequencies to develop improved sensors for geological surveys as well as communications systems for subterranean environments. At higher frequencies this technology may also be used to reduce the size of amateur radio and CB antennas.

Traditional compact low frequency antennas suffer from poor radiation efficiency making them impractical transmitters. A century of innovation has not yet fulfilled the long-felt need for compact efficient low-frequency transmitters. For dipole and monopole antennas this inefficiency is primarily due to the low Q associated with coiled inductors. U.S. Pat. No. 8,958,766B2 does teach using electromechanical resonators to achieve inductors with much higher Q's (for use in low-power rectifiers, not electrically-small antennas). However conventional off-the shelf resonators (used for timing circuits) cannot be used in small transmit antennas because the amount of power these devices can handle is too low due to nonlinearities and thermal effects. From prior art, it is therefore not obvious how to how to use electromechanical resonators such as quartz tuning forks and MEMS devices to improve the efficiency of a dipole antenna or array of dipole antennas, while allowing these antennas to handle the large powers required for transmit applications.

BRIEF DESCRIPTION OF THE INVENTION

In one aspect the present invention provides an antenna system comprising: at least one active element having a first end for connection to a radio receiver, transmitter or transceiver, and at least one electromechanical resonator connected in series with (i) at least a portion of said at least one active element and at least another portion of said at least one active element or (ii) said at least one active element and said radio receiver, transmitter or transceiver.

In another aspect the present invention provides a dipole antenna having two arms, each arm having at least one opening therein defining at least first and second portions of the arm in which the at least one opening is located, each opening being occupied by at least one electromechanical resonator connected to the at least first and second portions of the arm whose opening it occupies.

In still yet another aspect the present invention provides an antenna comprising an array of dipole antenna elements, each of the dipole antenna elements having two arms with at least one opening therein, each said opening being occupied by an electromechanical resonator, at least one of said dipole antenna elements in said array being adapted to be electrically excited by a radio transmitter, the remaining dipole antenna elements in said array surrounding, at least in part, said at least one of said dipole antenna elements in said array, each of the electromechanical resonators in said openings presenting a positive reactance to those portions of the dipole antenna element on either side of said opening at intended frequencies of operation of the antenna.

DETAILED DESCRIPTION

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112(f). In particular, the use of "step of" or "act of" in the claims herein is not intended to invoke the provisions of 35 U.S.C. 112(f).

Figure 1A:
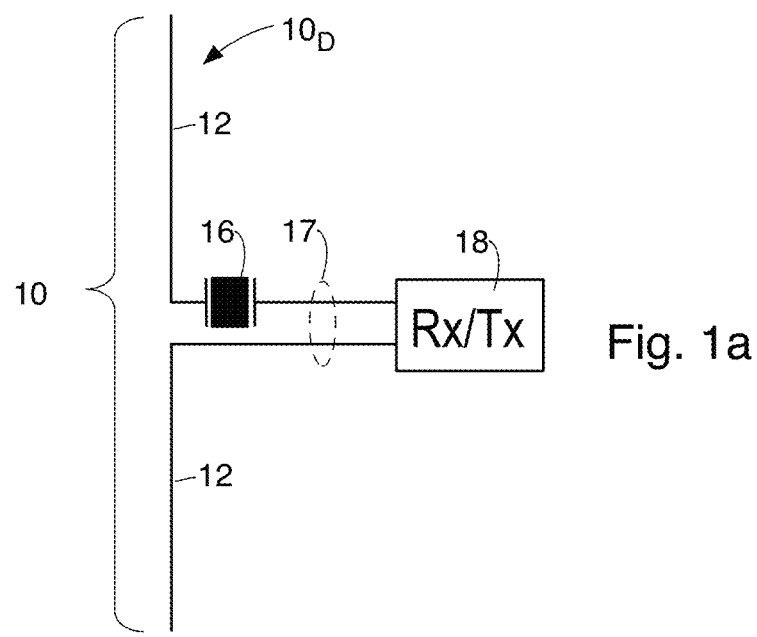
FIG. 1a depicts an electrically short dipole antenna loaded with an electromechanical resonator.

This invention, in one embodiment thereof depicted by FIG. 1a, comprises an antenna 10. The particular antenna in this embodiment is a dipole antenna $10_D$ of electrically small size, but the invention is not limited to dipole antennas. The dipole antenna has two thin metallic rods or metal sheets (often called arms) 12 which are connected, in use, to a transmitter, receiver, or transceiver 18. The arms 12 of the dipole antenna 10 of FIG. 1a are also known by those skilled in the art as active elements 12 of the antenna 10. Between the transmitter, receiver, or transceiver 18 and one of the two thin metallic rods or metal sheets or arms or active elements 12 is connected an electromechanical resonator 16 tuned to present a positive reactance at the intended frequency of operation of the antenna $10_D$. Since the antenna $10_D$ is of electrically small size, it presents a negative reactance (that is it exhibits capacitance) at its intended frequency of operation. Ideally, the negative reactance of the antenna is at least partially offset by the positive reactance of the electromechanical resonator 16. Those schooled in this art realize that antennas used in practical applications often must function over a range of frequencies and also realize that RF signals transmitted by (or received by) the antenna have a bandwidth associated with them, so the term "the intended frequency of operation" in practice really refers to a range or band of frequencies at which the antenna 10 will be utilized. In the antenna art, one quality which relates to the suitability of an antenna for practical use is the Standing Wave Ratio (SWR). A SWR of one is ideal. That means all of the power sent by the transmitter 18 to the antenna $10_D$ is being radiated by the antenna. A SWR of say 3.0 is often unacceptable. Placing the electromechanical resonator 16 in series with the antenna will improve the SWR of the antenna/resonator combination compared to the antenna 10D alone without the electromechanical resonator 16.

The electromechanical resonator 16 can either be embodied with one of the antenna elements or it may be an added component. When the antenna is intended to be connected to a transmitter or transceiver, an antenna junction is provided which often called an antenna feed point and the two thin metallic rods or metal sheets are often called driven elements. The feed point may be considered to be either upstream or downstream of the electromechanical resonator 16 of FIG. 1a depending on, for example, whether the electromechanical resonator 16 is embodied with the antenna 10 or provided as an add-on element.

The transmitter, receiver, or transceiver 18 may be remotely located relative to the antenna in which case a transmission line 17, which may be many feet in length, connects the transmitter, receiver, or transceiver 18 to the antenna $10_D$. On the other hand the transmitter, receiver, or transceiver 18 may be located very close to the antenna $10_D$ if the transmitter, receiver, or transceiver 18 is embodied as a hand held communication apparatus. In such an embodiment, the transmission line 17 may be very short (and thus effectively omitted) and may be embodied mostly as conductive traces on a printed circuit board disposed within the aforementioned hand held communication apparatus.

Figure 1B:
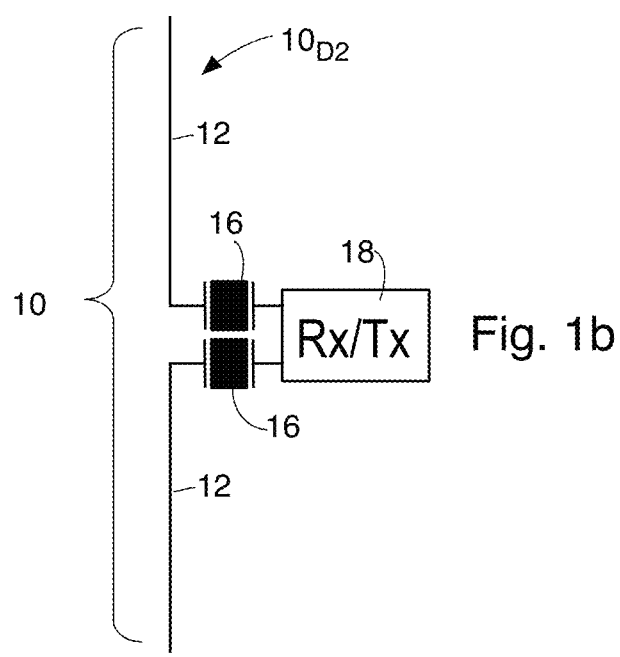
FIG. 1b depicts an electrically short dipole antenna loaded with two electromechanical resonators.

FIG. 1b depicts another embodiment of an electrically small dipole antenna 102 that is similar to the embodiment of FIG. 1a, but in this embodiment an electromechanical resonator 16 is placed in series with each of the two active elements 12 of a dipole antenna and a feed line (if present, see FIG. 1a) and the transmitter, receiver, or transceiver 18.

Figure 1C:
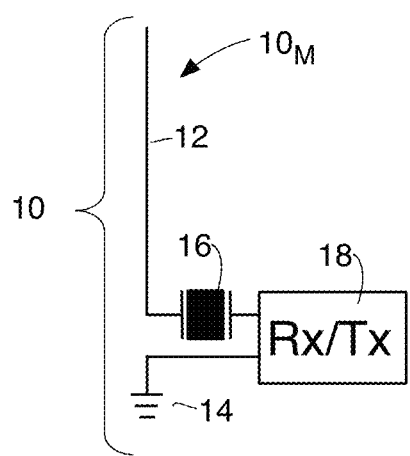
FIG. 1c depicts an electrically short monopole antenna loaded with an electromechanical resonator.

In an another alternative embodiment depicted by FIG. 1c, the antenna 10 comprises a monopole antenna $10_M$ having of a singular metallic rod or metal sheet or active element 12 disposed over a ground plane 14 and typically mounted in a direction normal to the ground plane 14. An antenna feed point occurs between (i) the monopole where it approaches, but often does not contact, the ground plane and (ii) the ground plane. Connected across the terminals of the aforementioned monopole antenna is a transmitter, receiver, or transceiver 18 connected in series with an electromechanical resonator 16 tuned to present a positive reactance at the intended frequency of operation for the antenna 10. The ground plane 16 can be earthen ground (i.e. the earth's surface . . . perhaps augmented with ground radials . . . or it may be a metallic surface(s) such as can be found on equipment and/or vehicles of many different types, including, but not limited to cars, trucks, recreational vehicles, ships, boats, submarines, satellites, and military equipment.

Figure 2A:
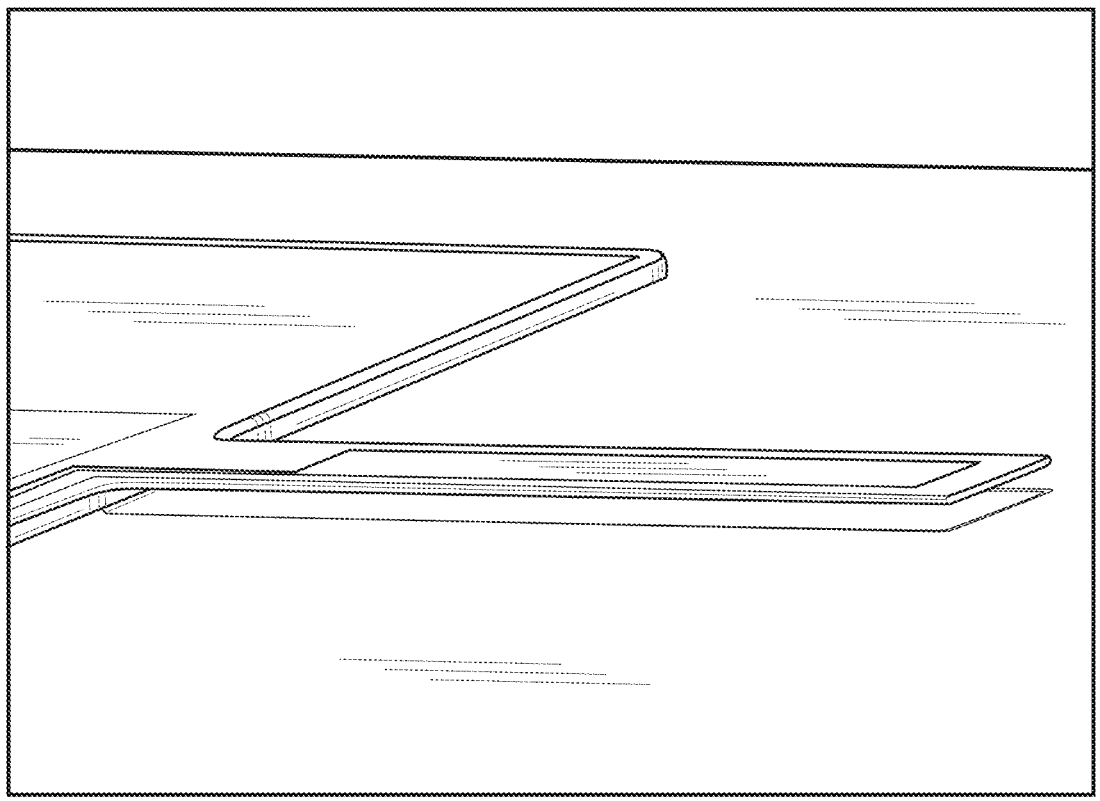
FIG. 2a depicts an embodiment of an electromechanical resonator, this particular embodiment being a quartz shear mode Micro Electro-Mechanical System (MEMS) device.

In these embodiments, the tuning of the electromechanical resonator 16 to present a positive reactance at the intended frequency of operation of the antenna 10 is achieved either by modifying the construction or geometry of the resonator 16 before installation into or adjacent the antenna 10 or by using external capacitive tuning elements to shift its resonant frequency. FIG. 2a shows the electromechanical resonator 16 being embodied as a quartz shear mode MEMS (Micro Electro-Mechanical System) device made by HRL Laboratories LLC of Malibu, California. Other possible embodiments of the electromechanical resonator 16 are discussed below.

The embodiments of FIGS. 1a-1c show the use of the present invention with simple antennas: dipoles and monopoles. The invention, however, may be used with other antenna types, such as: slot antennas, Vivaldi antennas, Yagi-Uda antenna, etc. The present invention is particularly useful when the antenna is electrically short. When an antenna is electrically short it exhibits capacitive reactance (the value of its reactance is negative according to how reactance is conventionally measured). Those skilled in the art recognize if an antenna is reactive that causes an impedance mismatch between the antenna and the transmitter, receiver, or transceiver 18 to which it is connected. A small amount of impedance mismatch can normally be tolerated by the transmitter, receiver, or transceiver 18 to which the antenna is connected without difficulty. But a large mismatch (resulting in a VSWR is greater than 2.0 to 4.0 for example) can result in a receiver functioning much less efficiently or in a transmitter shutting itself down as a mean of self protection from the power reflected by the antenna 10 in an impedance mismatch situation.

For hand held transceivers. the size of the antenna can be much bigger than the size of the electronics in the transceiver itself. So reducing the size of the antenna has many advantages for the user in terms of user convenience, if nothing else, but reducing the size of the antenna will cause the antenna to exhibit capacitive reactance and hence an impedance mismatch if step are taken to deal with that capacitive reactance.

In the following discussions, an ideal situation will be discussed where in reactance of the antenna is "cancelled" or "offset" by the electromechanical resonator(s) 16. But in real life, the electromechanical resonator(s) 16 may present (a) not quite enough positive reactance (inductive reactance) to completely offset the negative reactance (capacitive reactance) of the antenna or present (b) perhaps a little more positive reactance (inductive reactance) than needed to offset the negative reactance (capacitive reactance) of the antenna. But so long as the resulting impedance mismatch resulting from situations (a) or (b) above can be tolerated by the transceiver 18, then the total reactance of the antenna 10 plus the electromechanical resonator(s) 16 has been reduced to an acceptable level, even if not completely cancelled.

Figure 2B:
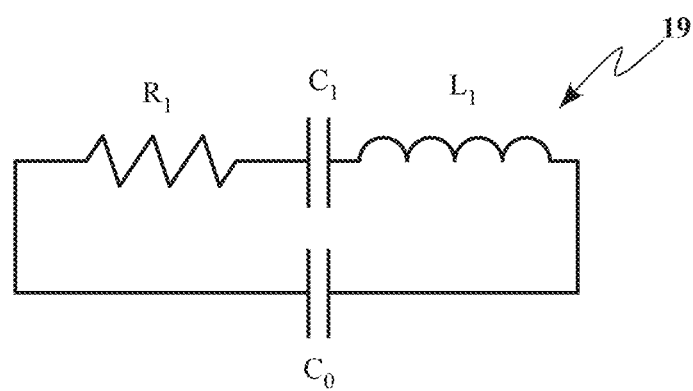
FIG. 2b depicts the equivalent circuit of an electromechanical resonator.

In mathematical terms it is easier to talk about the ideal situation of cancelling the reactance of an electrically short antenna, but it should be borne in mind, that getting close to cancellation (so that the VSWR is reduced to an acceptable level) is a highly desirable result of utilizing the present invention.

parallel resonance. Exemplary BVD parameter values are listed in table I above along with a suggested electromechanical resonator type to be used in the frequency bands identified in that table. At frequencies between the series and parallel resonance frequencies, the reactance of this circuit of FIG. 2b is positive causing the electromechanical resonator to effectively behave like an inductor over a narrow frequency range (<1% bandwidth). Because the resistance associated with this reactance is much lower than a comparable prior art coiled inductor, the effective inductor Q is much higher than a comparable prior art coiled inductor. When placed in series with the aforementioned dipole or monopole antenna 10, this high Q inductance serves to improve efficiency by canceling the capacitive reactance of the electrically short antenna 10 and improving impedance matching to transmitter, receiver, or transceiver modules 16. The electromechanical resonator 16 used in these embodiments is selected such at its BVD parameter values place the aforementioned series and parallel resonance vlues on either side of the intended frequency of operation of the antenna and its transmitter, receiver, or transceiver 18.

According to R. C. Hansen (see R. C. Hansen, "Efficiency and Matching Tradeoffs for Inductively Loaded Short Antennas" *IEEE Transactions on Communications*, Vol. Com-23, No. 4, April 1975), the radiation efficiency of an electrically small dipole or monopole antenna is given by equation 1 (Eqn. 1) below:

$$\eta = \frac{R_{rad}}{R_{rad} + R_{loss} + R_{match}}, \qquad \text{(Eqn. 1)}$$

where $R_{rad}$ is the antenna radiation resistance for a monopole antenna, $R_{loss}$ is the ohmic loss of the antenna, and $R_{match}$ is the ohmic loss associated with the matching network. For monopole antennas, $R_{rad}=10k^2h^2$ where k is the freespace wavenumber and h is the height of the monopole, $R_{loss}=R_s h/3\pi a$ where a is the diameter of the conductor and $R_s$ is the surface resistivity in ohms per square, and $R_{match}=|X_a|/Q$ where $X_a$ is the antenna reactance and Q is the quality factor of the inductor used to match the antenna reactance. Traditional matching networks employing coiled

TABLE I

| Frequency Bands | UHF band and above | VHF & UHF band | MF and HF bands | VLF and LF bands |
| --- | --- | --- | --- | --- |
| Electromechanical Resonator type and data sources | UHF BAW Resonator [Source: R. Ruby, "1IE–2 Review and comparison of bulk acoustic wave FBAR, SMR Technology." Ultrasonics Symposium, 2007. IEEE. IEEE, 2007.] | VHF Shear Mode Resonator [Source: Multiphysics simulation performed at HRL Laboratories] | MF Extensional Mode Resonator [Source: CX4 Crystal Data Sheet, Statek Corporation. ] | LF Tuning Fork Resonator [Source: Multiphysics simulation performed at HRL Laboratories] |
| $R_1$ (Ω) | 0.26 | 3 | 400 | 125 |
| $C_1$ (F) | 9.14E–14 | 5.00E–15 | 2.00E–15 | 1.99E–13 |
| $L_1$ (H) | 7.10E–08 | 5.00E–03 | 12.665 | 31 |
| $C_0$ (F) | 1.56E–12 | 8.00E–13 | 8.00E–13 | 7.60E–13 |

The electrical properties of a electromechanical resonator 16 can be modeled as a series inductor $L_1$, capacitor $C_1$, and resistor $R_1$, in parallel with another capacitor $C_0$. This equivalent circuit 19 (see FIG. 2b), also known as the Butterworth-Van Dyke (BVD) model, has both a series and inductors with low Q (~50) result in large ohmic losses and poor efficiency for electrically small antennas. Furthermore, as antennas become excessively small (and thus exhibits a high negative reactance) extremely large coiled inductors have been required to generate the reactances required for effective matching. This invention overcomes these limitations by replacing coiled inductors used in the prior art with high Q electromechanical resonators 16.

The selection of particular type of electromechanical resonator 16 preferably used depends primarily on the frequency band of operation. At VLF and LF bands tuning fork resonators are preferably utilized, while at MF and HF bands extensional mode resonators are preferably utilized, at VHF and UHF frequencies shear mode resonators are preferably utilized and at L- to C-band frequencies Bulk Acoustic Wave resonators are preferably utilized. Each of these resonators 16 employs a piezoelectric crystal for coupling applied of voltages to mechanical modes. In the preferred embodiments this crystal is quartz, although any variety of piezoelectric crystal can be utilized including AlN and $LiNbO_3$. The choice of crystal is governed by the desired temperature stability, resonator Q, nonlinear characteristics under high drive levels, as well as the piezoelectric effective coupling coefficient $k_{eff}^2$.

It should also be recognized that the resonator type suggested in the preceding paragraph and in Table I just suggestions as other electromechanical resonator types may be used instead, particularly when the desired frequency of operation at near a band edge as identified in the table. For example, the BVD model parameters for a 32 KHz extensional mode quartz resonator (instead of the suggested shear mode resonator) are listed in Table II below:

TABLE II

| Parameter | Value |
|---|---|
| $C_0$ | 2 pF |
| $C_1$ | 10 fF |
| $L_1$ | 2474 H |
| $R_1$ | 248 Ω |

The antenna specification will include such items as resonant frequency, bandwidth, voltage out for a given input AC magnetic field, and output impedance. Once these specifications are determined the resonator design can be determined. For UHF operation, a shear mode resonator will be the likely be the superior choice as noted above. For HF operation, an extensional mode resonator would be best choice to keep the thickness of the resonator from becoming excessively large to prevent the use of deep trench quartz etching. For LF applications, a tuning fork design will probably be the best choice, again due to thickness issues for an optimized design.

Now, to demonstrate the effectiveness of matching electrically small dipole antennas $10_D$ and electrically small monopole antennas $10_M$ with electromechanical resonators 16, simulations with various resonator types were performed at different frequency bands or ranges. Van-Dyke parameters for a quartz tuning fork at LF frequencies (30 kHz to 300 kHz) and a quartz shear mode resonator at VHF frequencies (30 MHz to 300 MHz) were obtained using multi-physics simulations performed using COMSOL simulation software. Van-Dyke parameters for a quartz extensional mode resonator at MF frequencies (300 kHz to 3 MHz) and an AlN BAW resonator at S-band frequencies (2 to 4 GHz) were obtained from published measurements as noted in Table I. Using these Van-Dyke parameters, the effective inductance ($L_{eff}=X_{VanDyke}/\omega$) and inductor Q ($Q_{eff}=X_{VanDyke}/R_{VanDyke}$) were calculated and used to determine the predicted efficiency for electrically small monopole antennas in the respective frequency range. FIGS. 3-6 compare this efficiency with the same antennas matched with a traditional prior art chip coil inductor of Q=50.

Figure 3:
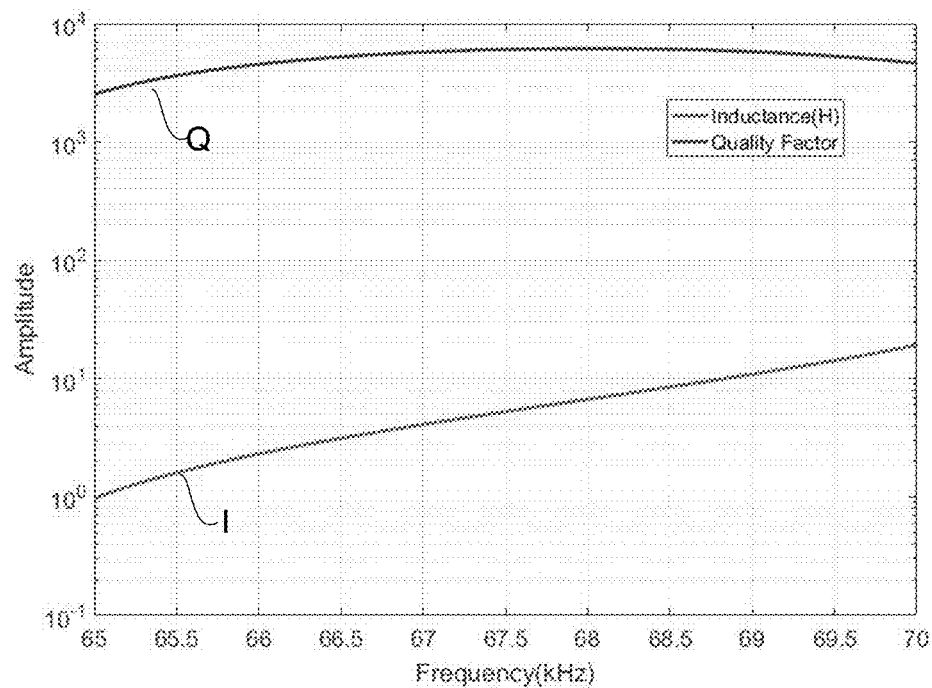
FIG. 3 has two graphs of simulations done for an antenna designed to operate at about 67.5 kHz in the LF band, the upper graph showing the inductance and quality factor of a suitably built electromechanical resonator (versus frequency) and the lower graph comparing the efficiency of the antenna versus the length of an active element thereof for both an embodiment utilizing the electromechanical resonator according to the upper graph with a similar antenna using a state of the art (SOA) conventional off the shelf (COTS) chip inductor (having a Q of 50).
Figure 3:
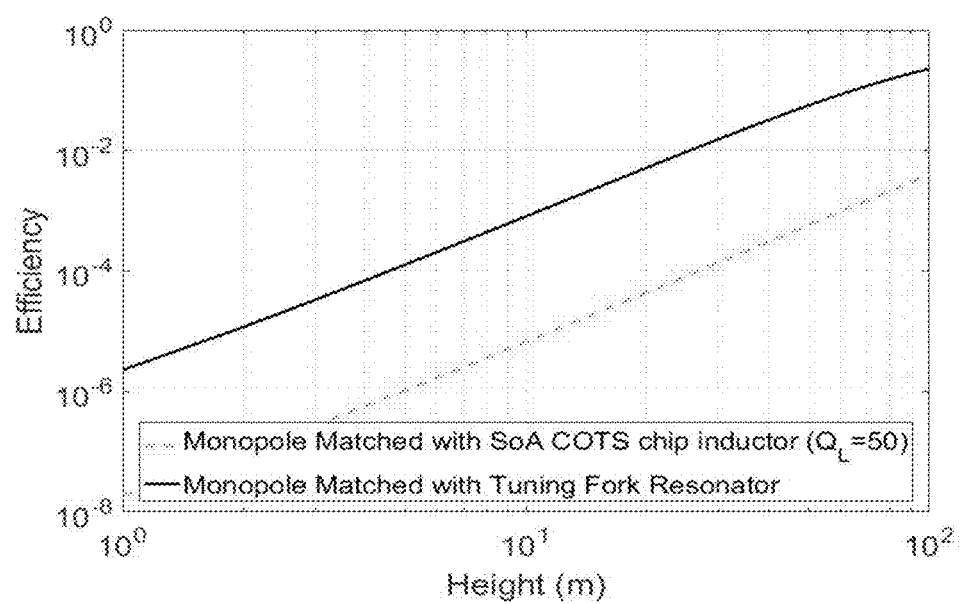
Figure 4:
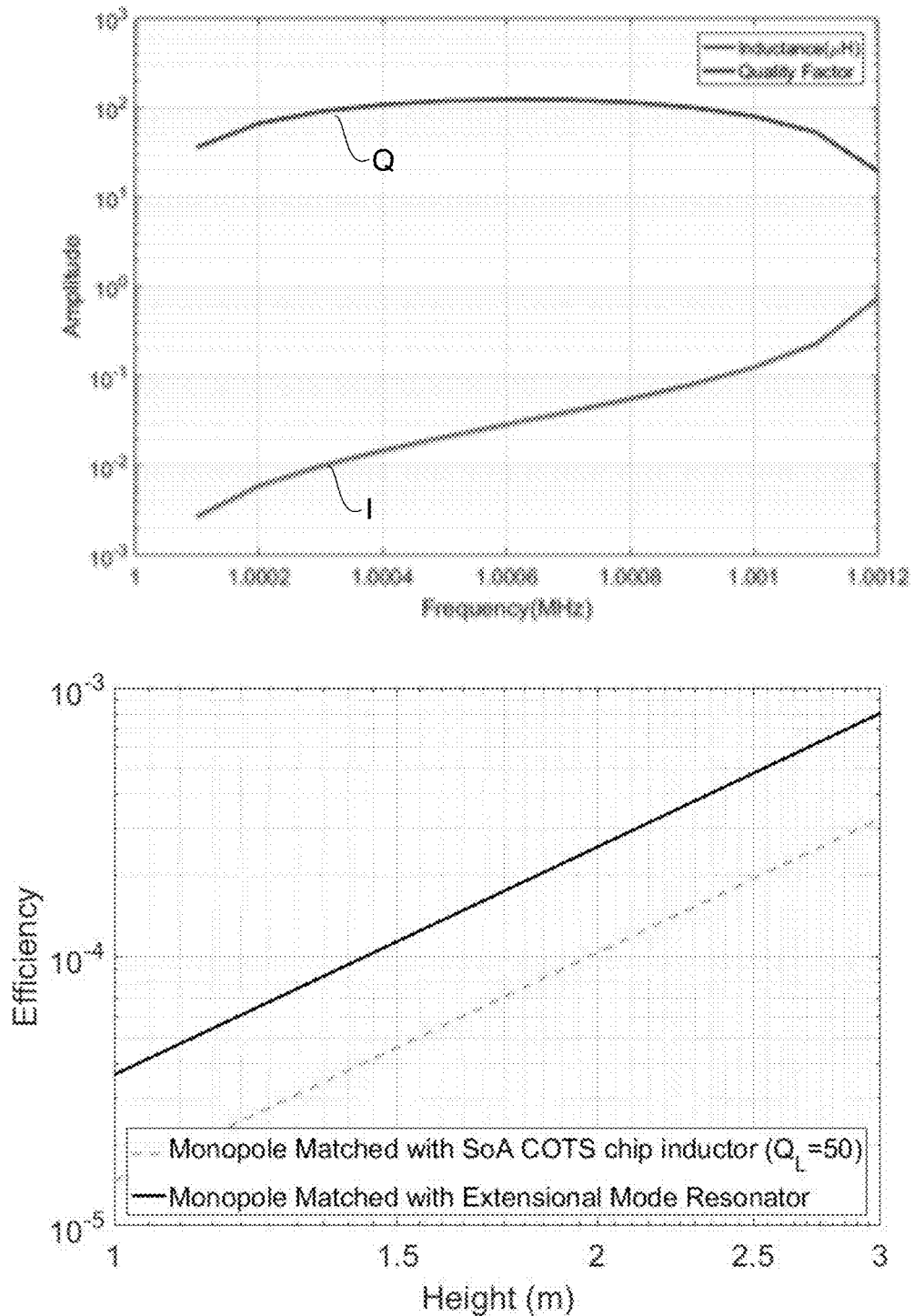
FIG. 4 has two graphs of simulations done for an antenna designed to operate at about 1.006 MHz in the MF band, the upper graph showing the inductance and quality factor of a suitably built electromechanical resonator (versus frequency) and the lower graph comparing the efficiency of the antenna versus the length of an active element thereof for both an embodiment utilizing the electromechanical resonator according to the upper graph with a similar antenna using a state of the art (SOA) conventional off the shelf (COTS) chip inductor (having a Q of 50).
Figure 5:
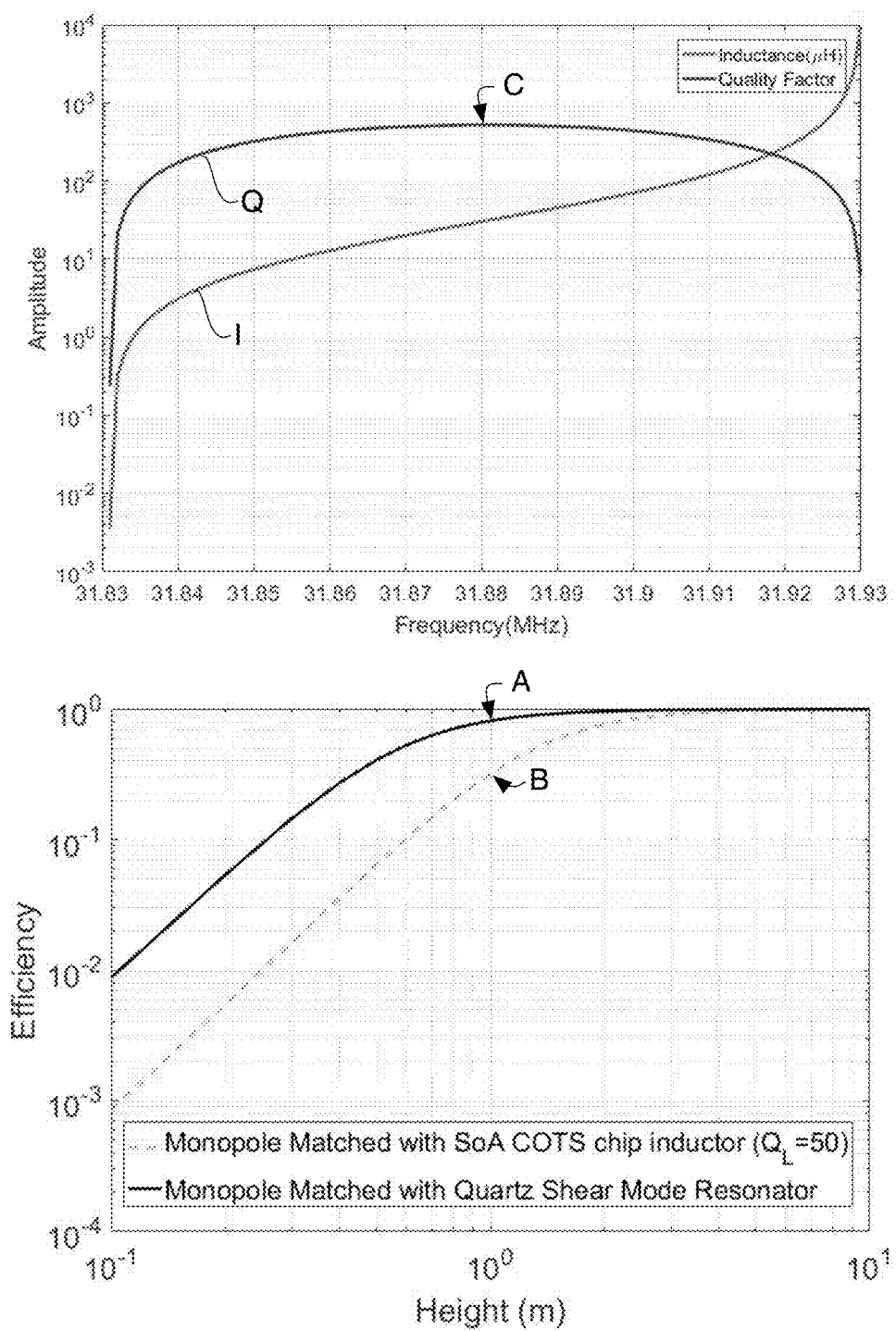
FIG. 5 has two graphs of simulations done for an antenna designed to operate at about 31.88 MHz in the VHF band, the upper graph showing the inductance and quality factor of a suitably built electromechanical resonator (versus frequency) and the lower graph comparing the efficiency of the antenna versus the length of an active element thereof for both an embodiment utilizing the electromechanical resonator according to the upper graph with a similar antenna using a state of the art (SOA) conventional off the shelf (COTS) chip inductor (having a Q of 50).
Figure 6:
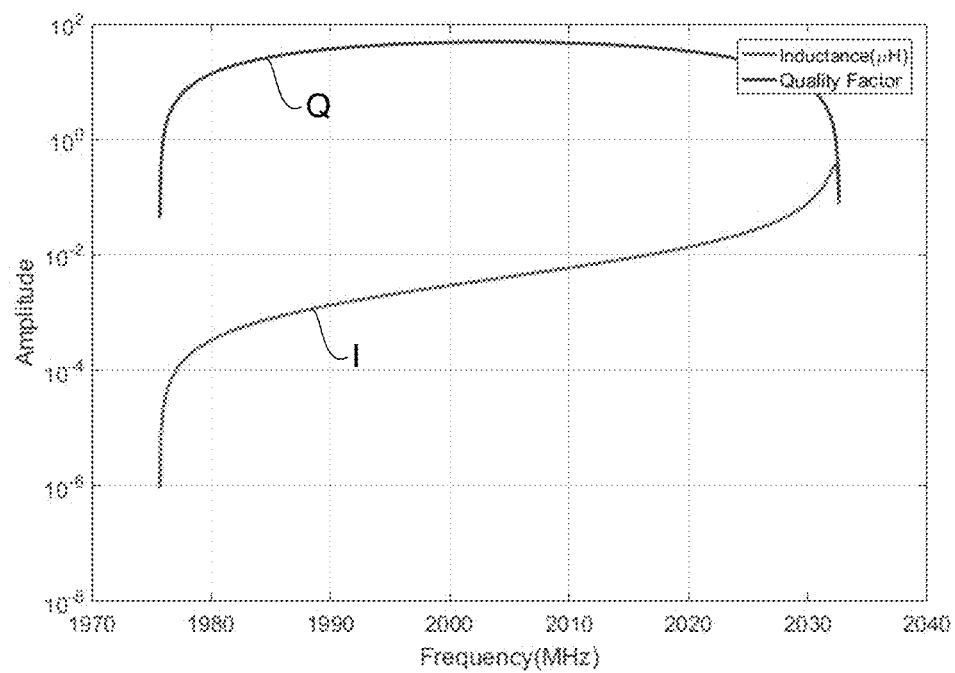
FIG. 6 has two graphs of simulations done for an antenna designed to operate at about 2.005 GHz in the UHF band, the upper graph showing the inductance and quality factor of a suitably built electromechanical resonator (versus frequency) and the lower graph comparing the efficiency of the antenna versus the length of an active element thereof for both an embodiment utilizing the electromechanical resonator according to the upper graph with a similar antenna using a state of the art (SOA) conventional off the shelf (COTS) chip inductor (having a Q of 50).
Figure 6:
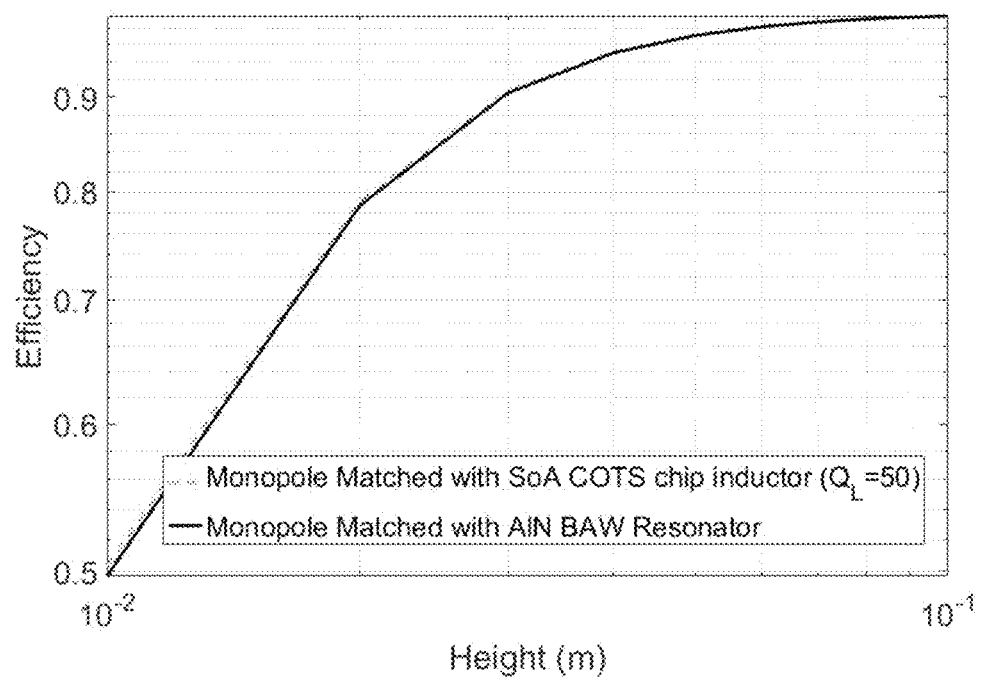

FIG. 3 has two graphs of simulations done for an antenna designed to operate at about 67.5 kHz in the LF band using the resonator having BVD paramaters listed in the fourth containing data column (e.g., the right most column) in Table I. FIG. 4 also has two graphs of simulations done for an antenna designed to operate at about 1.006 MHz in the MF band, the resonator having BVD parameters listed in the third column containing data in Table I. FIG. 5 has also two graphs of simulations done for an antenna designed to operate at about 31.88 MHz in the VHF band, the resonator having BVD parameters listed in the second column containing data in Table I. Finally, FIG. 6 has two graphs of simulations done for an antenna designed to operate at about 2.005 GHz in the UHF band, the resonator having BVD parameters listed in the first column containing data in Table I above.

For a given resonator design, the optimal operating point in frequency occurs when the effective inductor Q is maximum. The generated inductance value at this optimum, can be modified by changing the shape and size of the resonator to match the capacitive reactance of the antenna. In general, the higher the modal mass of the mechanical resonator, the larger the equivalent inductance. One potential limitation of this technique, is that the bandwidth over which this high Q inductance can be achieved is exceedingly narrow.

Modal mass is the mass of a spring/mass resonator that is electrically equivalent to the BVD model of the resonator. Thus, high L1 is equivalent to high modal mass. The modal mass is only weakly determined by the modal confinement and hence the Q. One can easily vary the Q for a particular resonator by varying the electrode and plate geometry. However, for changing the modal mass one needs to change the size of the resonator which usually produces a different optimized operating frequency.

While each of the FIGS. 3-5 show marked improvements in efficiency if an electromechanical resonator 16 is used rather than a prior art chip inductor, consider the marked improvement for the antenna represented by FIG. 5. This antenna is resonant at 31.88 MHz. Those skilled in the art would immediately recognize that a full size (quarter wavelength) monopole antenna resonant at 31.99 MHz would have a height of about 2.5 m. Of course, that dimension can be calculated exactly, but what is of interest is an electrically short antenna. A monopole having a height of only 1 m is very clearly electrically short if it is to be operated at 31.88 MHz. If an electromechanical resonator 16 is used (as depicted by FIG. 1b) having the characteristics of the upper graph of FIG. 5, as can then be seen from the lower graph, the efficiency of the resulting antenna is about 95% (see point "A" marked on the lower graph). But if a prior art chip inductor is instead used (having a Q of only about 50), then the efficiency drops to about 30% (see point "B" marked on the lower graph). The advantage of using an electromechanical resonator 16 with a Q of abut 500 (see point "C" marked on the upper graph) instead of a prior art chip inductor in the monopole antenna 10 of FIG. 1b is nothing less than remarkable.

It appears that the higher the Q of the electromechanical resonator 16 the greater the improvement in efficiency. Compare FIGS. 3-6. The BAW electromechanical resonator of FIG. 6 has a Q between 50 and 100 and shows little improvement efficiency-wise over a chip inductor (with an assumed Q of 50). But using a BAW electromechanical resonator instead of a chip inductor can still yield benefits since the BAW electromechanical resonator should be smaller in size and also the BAW electromechanical resonator should have series and parallel resonances (and hence exhibit 2 poles), and this present a better match than would a single pole chip inductor.

Figure 7:
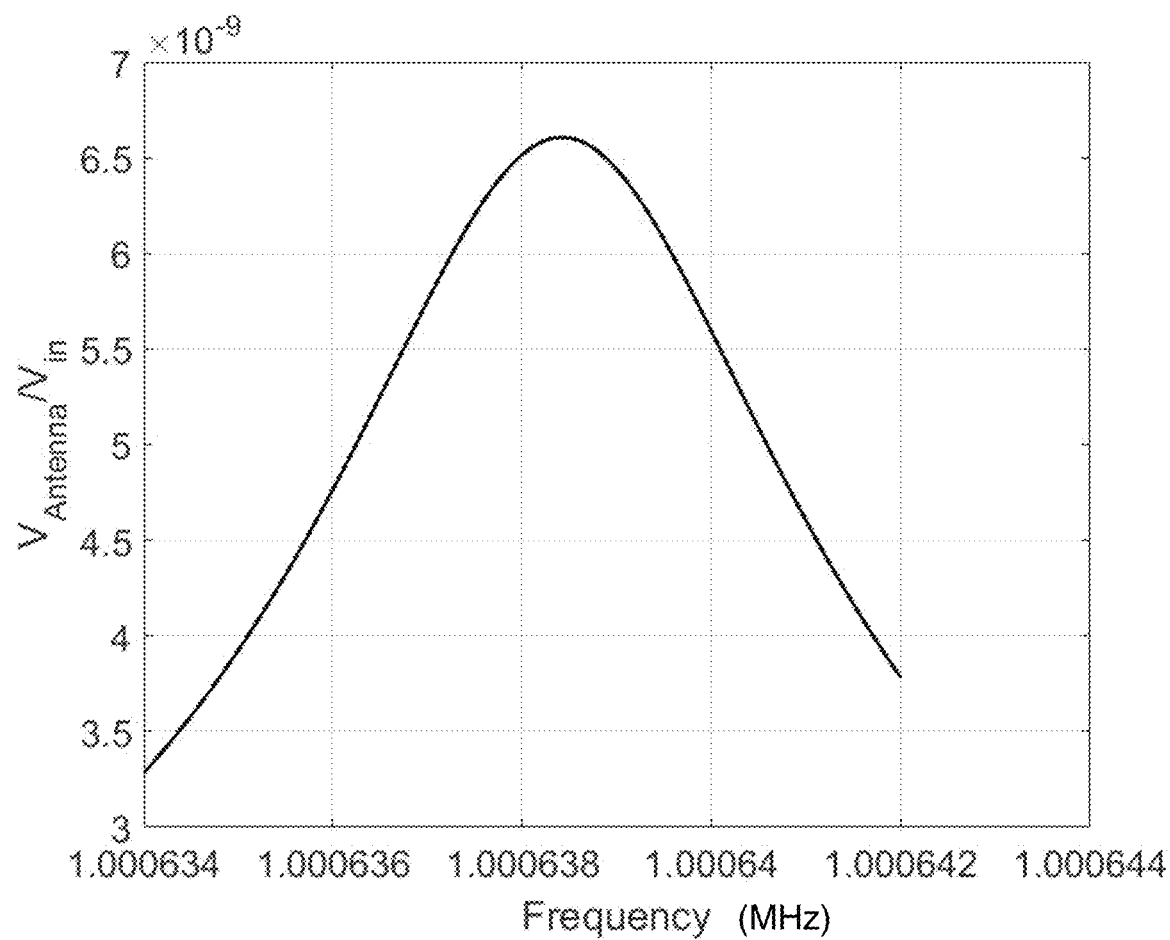
FIG. 7 shows a plot of the voltage gain for a 0.05 m monopole antenna matched with the MF quartz extensional mode resonator.

FIG. 7, shows a plot of the voltage gain for a 0.05 m monopole antenna matched with the MF quartz extensional mode resonator The efficiency is shown in FIG. 4. It can be seen from this plot the 3-dB bandwidth of this voltage transfer is less than 10 Hz.

Figure 8A:
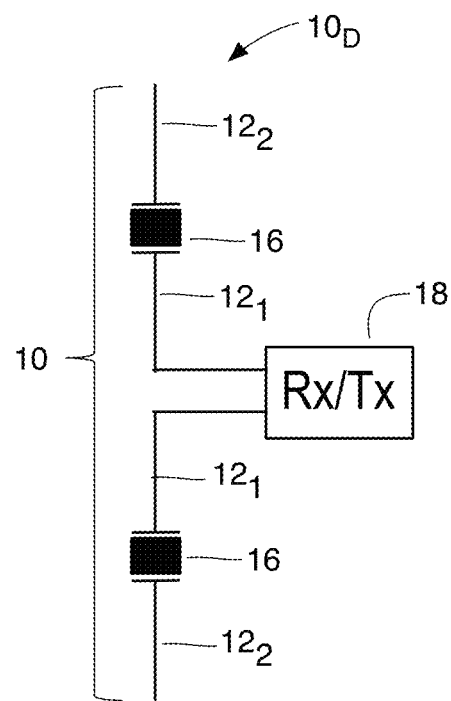
FIGS. 8a and 8b depict embodiments where an electromechanical resonator is placed in an antenna element along the active element(s) of the antenna as opposed to at an input end of the antenna element.
Figure 8B:
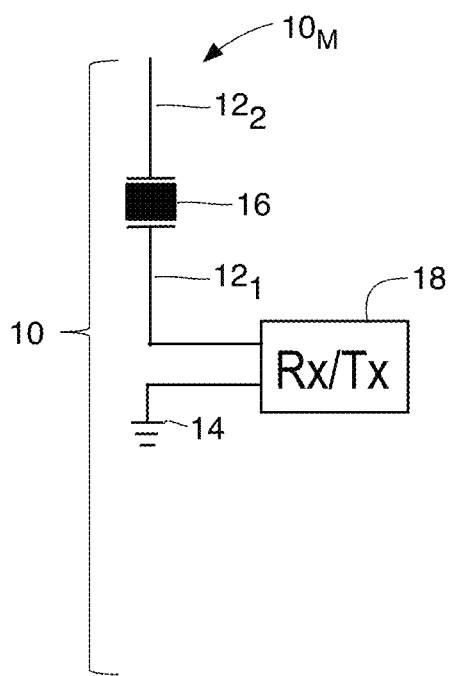

In another embodiment this invention comprises a dipole antenna (see FIG. 8a) or monopole (see FIG. 8b) antenna 10 comprising two thin metallic rods or metal sheets (arms) connected to a transmitter, receiver, or transceiver 18 In the case of the dipole antenna both thin metallic bodies (arms) are formed to define two portions $12_1$ and $12_2$ which are separated from each at some point along their length (preferably at a point about 40% of the total length of arm from the driven end). In the case of the, monopole antenna a single break or opening in placed somewhere along the length of the singular metallic body in that embodiment. Connected across the break or opening is one (or more) of the aforementioned electromechanical resonators 16. This resonator 16 is once again tuned to present a positive reactance to cancel (or partially offset) the capacitive reactance of the dipole or monopole antenna. In addition to mathematically canceling the reactive impedance of the antenna, placement of the resonator into the body of the dipole or monopole serves to increase the radiation resistance of the antenna by redistributing current on the antenna structure. This effect is captured by the following modified radiation efficiency equation provided by R. C. Hansen along its body can be written as:

$$\eta = \frac{Q_L \beta R_r}{Q_L \beta R_r + \alpha X_a}, \quad \text{(Eqn. 2)}$$

where $Q_L$ is the quality factor of the loading inductor, $\beta$ and $\alpha$ are constants defined by Hansen, $R_r$ is the radiation resistance of the antenna unloaded, and $X_a$ is the reactance of the antenna unloaded.

To demonstrate the effect of loading electromechanical resonators into an electrically small dipole antenna, simulations of a 32 MHz sheer mode resonator were performed in COMSOL simulation software. The parameters of the BVD model extracted from this simulation are given in Table III below (and these parameters are also listed for a VHF device in Table I above):

TABLE III

| Parameter | Value |
|---|---|
| $C_0$ | 0.8 pF |
| $C_1$ | 5 fF |
| $L_1$ | 5 mH |
| $R_1$ | 3 Ω |

Figure 9:
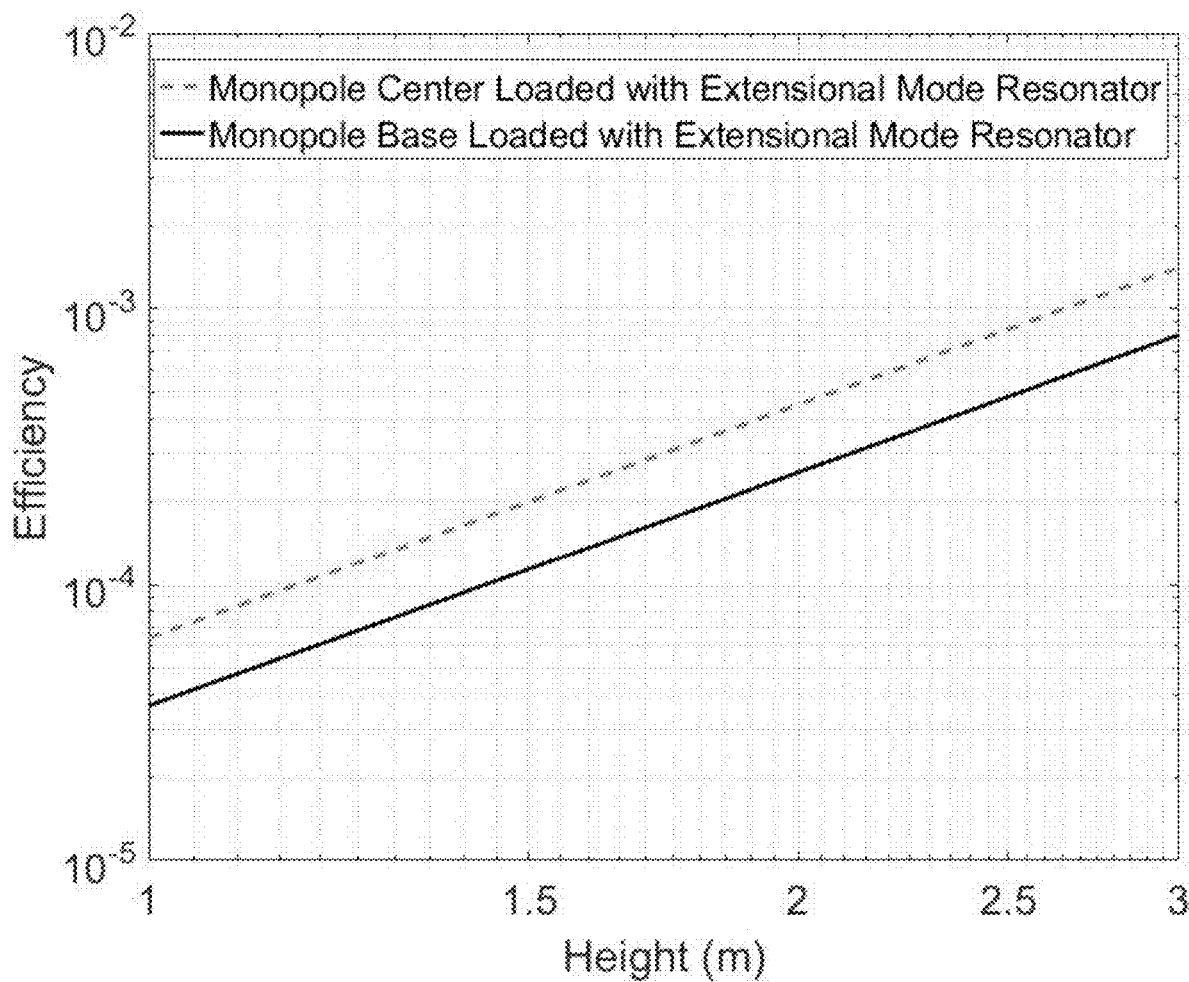
FIG. 9 is a graph showing that the efficiency of 12" dipole antenna center loaded with a quartz shear mode resonator is better than the same antenna base loaded with a quartz shear mode resonator.

Around 31.9 MHz this resonator exhibits an inductance of 31.5 µH along with a large quality factor of 520. See FIG. 9. which shows that the efficiency of 12" dipole antenna center loaded with a quartz shear mode resonator vs. the same antenna base loaded with a quartz shear mode resonator.

Figure 10A:
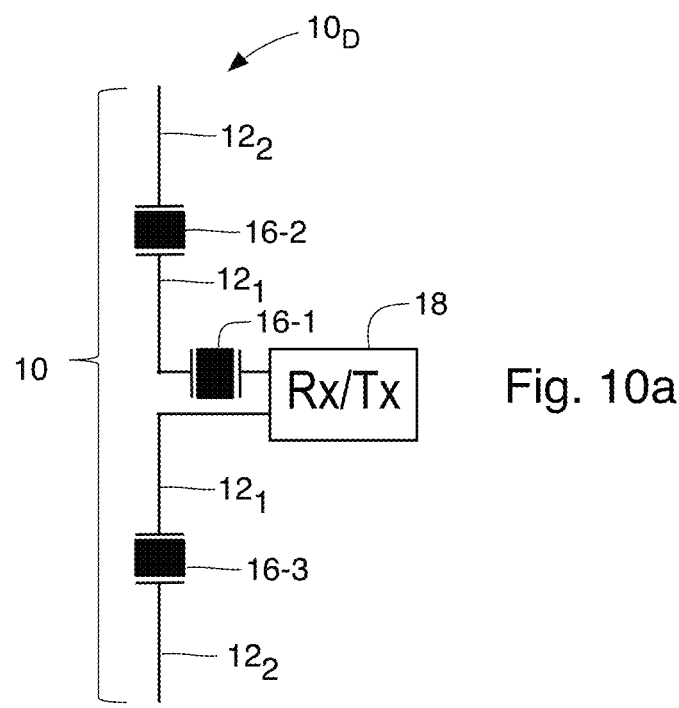
FIGS. 10a and 10b depict embodiments where an electromechanical resonator is placed in an antenna element along the active element of the antenna and additionally at an input end of the antenna element.
Figure 10B:
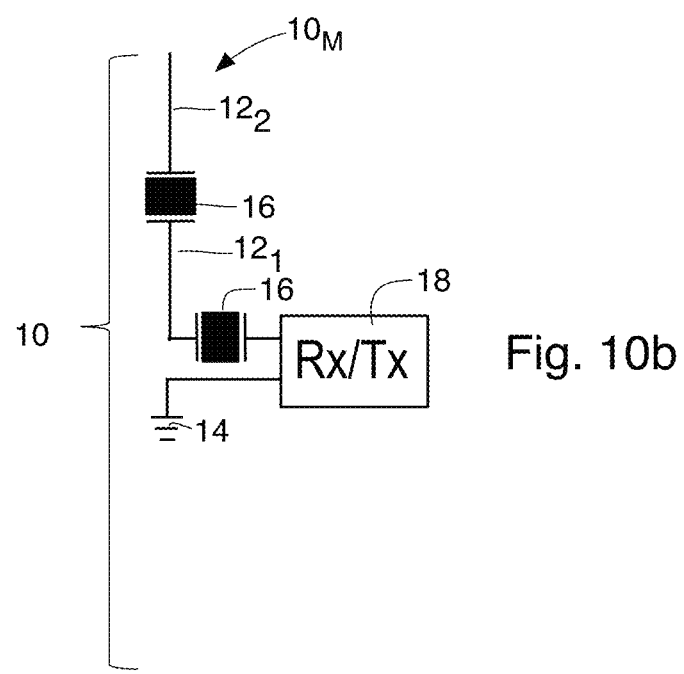

In additional embodiments this invention (see FIGS. 10a and 10b) a dipole antenna $10_D$ or monopole antenna $10_M$ comprises one or more thin metallic rods or metal sheets or bodies 12 connected to a transmitter, receiver, or transceiver 18. In the embodiment of FIG. 10a a dipole antenna both thin metallic bodies 12 are separated at some point along their length to define two portions $12_1$ and $12_2$ with an opening therebetween. In the embodiment of FIG. 10b, a monopole antenna 10M has a single break or opening in its thin metallic rod, metal sheet or body, forming or defining two portions $12_1$ and $12_2$, the opening occurring somewhere along the length of the metallic body (preferably about 40% along the length). Across these breaks or openings, one of the aforementioned electromechanical resonators 16 (numbered 16-2 and 16-3 in the embodiment of FIG. 10a) is placed. The resonator(s) is(are) tuned to present a positive reactance to partially cancel the capacitive reactance of the dipole or monopole antennas $10_D$, $10_M$. The remaining reactance may be cancelled (or further offset) by an additional electromechanical resonator 16-1 placed in series with the antenna $10_D$, $10_M$ at its feed point. In this configuration some (but preferably not all) of the electromechanical resonators 16, 16-1, 16-2 and 16-3 can be replaced with conventional inductors.

Figure 11A:
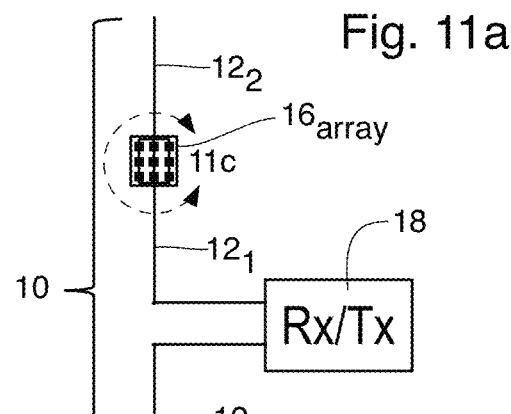
FIGS. 11a and 11b depict embodiments where an array of electromechanical resonators is placed in an antenna element along the active element(s) of the antenna instead of a single electromechanical resonator as in the embodiments of FIGS. 8a and 8b and FIG. 11c depicts an embodiment of an array of electromechanical resonators to be used with the embodiments of FIGS. 11a and 11b.
Figure 11B:
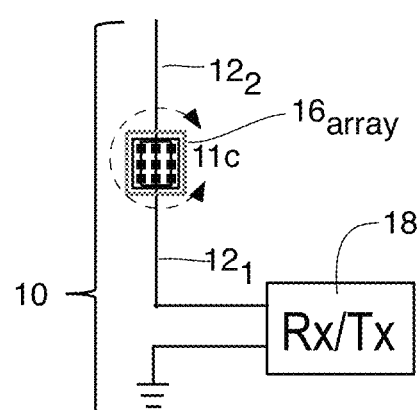
Figure 11C:
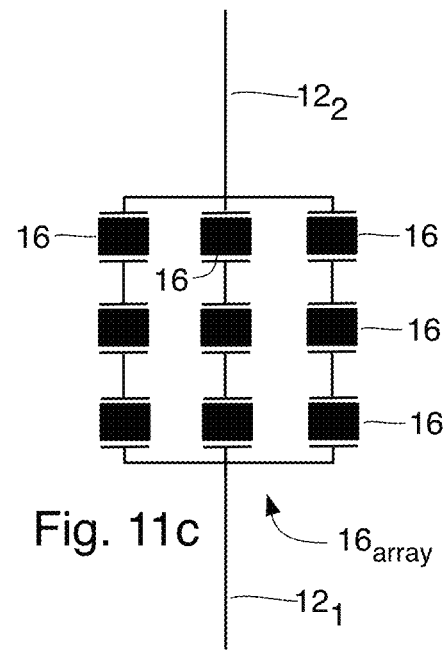

In yet other embodiments of this invention (see FIGS. 11a and 11b) a single dipole antenna or a monopole antenna may have its thin metallic rod(s) or metal sheet(s) connected to a transmitter, receiver, or transceiver 18. In the case of the embodiment of FIG. 11a both thin metallic bodies 12 are broken at some point along their length. In the case of the embodiment of FIG. 11b, a single break or opening in placed somewhere along the length of the singular metallic body 12. Across the break(s) or opening(s) in elements 12 are placed multiple electromechanical resonators 16 arranged preferably as an array $16_{array}$ of resonators 16. The resonators 16 in array $16_{array}$ are all tuned to present a positive reactance to cancel (or partially reduce) the capacitive reactance of the dipole or monopole antenna $10_D$, $10_M$. These resonators are preferably configured in a network or as an array having an equal numbers of individual series and parallel connected resonators 16 connected in an array $16_{array}$ such as that shown by FIG. 11c. The array $16_{array}$ is connected across each aforementioned break(s) or opening(s). This network or array configuration serves to reduce the voltage and current seen across each resonator 16 while maintaining the same reactance value as if a single resonator were used in lieu of array $16_{array}$.

Figure 12A:
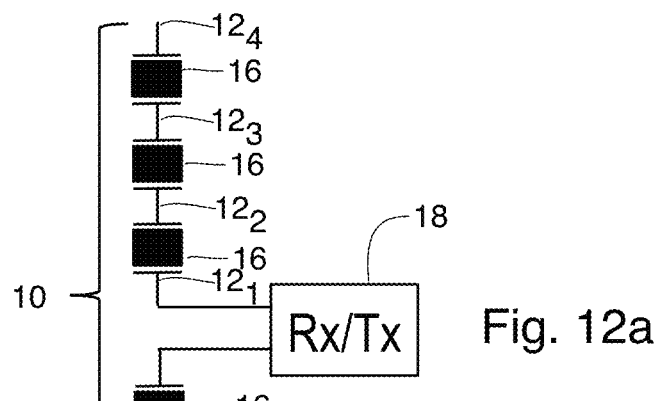
FIGS. 12a and 12b depicts still additional embodiments where a single dipole or monopole antenna comprising thin metallic rods or metal sheets connected to a transmitter, receiver, or transceiver. In the case of the dipole antenna embodiment both thin metallic bodies are broken at multiple points along their length. In the case of the, monopole antenna embodiment multiple breaks are placed somewhere along the length of the singular metallic body. Across the breaks one of the aforementioned electromechanical resonator types is placed.
Figure 12B:
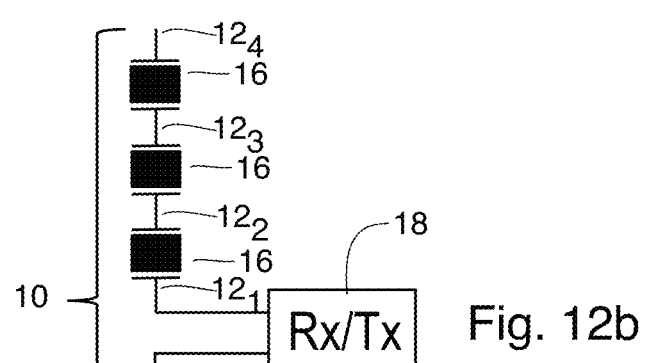

In additional embodiments of this invention (see FIGS. 12a and 12b) a single dipole or monopole antenna comprising two thin metallic arms or metal sheets connected to a transmitter, receiver, or transceiver 18. In the case of the dipole antenna both thin metallic bodies are broken or separated at multiple points along their length thereby defining portions $12_1$, $12_2$, $12_3$, and $12_4$ of each arm 12. In the case of a monopole antenna embodiment (see FIG. 12b), multiple breaks or openings are occur somewhere along the length of the singular metallic body. Connected across each of the breaks or openings is one (or an array—which may be a two dimensional array) of one (or more) of the aforementioned types of electromechanical resonators 16. These resonators 16 are all tuned to present a positive reactance to cancel (or at least partially offset) the capacitive reactance of the dipole or monopole antenna 10. The reactance value which need to be presented by each of these resonators 16 at the intended frequency of operation for the antenna is preferably determined by full wave simulation and occurs - - - . This embodiment serves to reduce the voltage seen across each resonator 16 compared to those embodiments having a single resonator in an arm of a dipole or monopole antenna.

Figure 13:
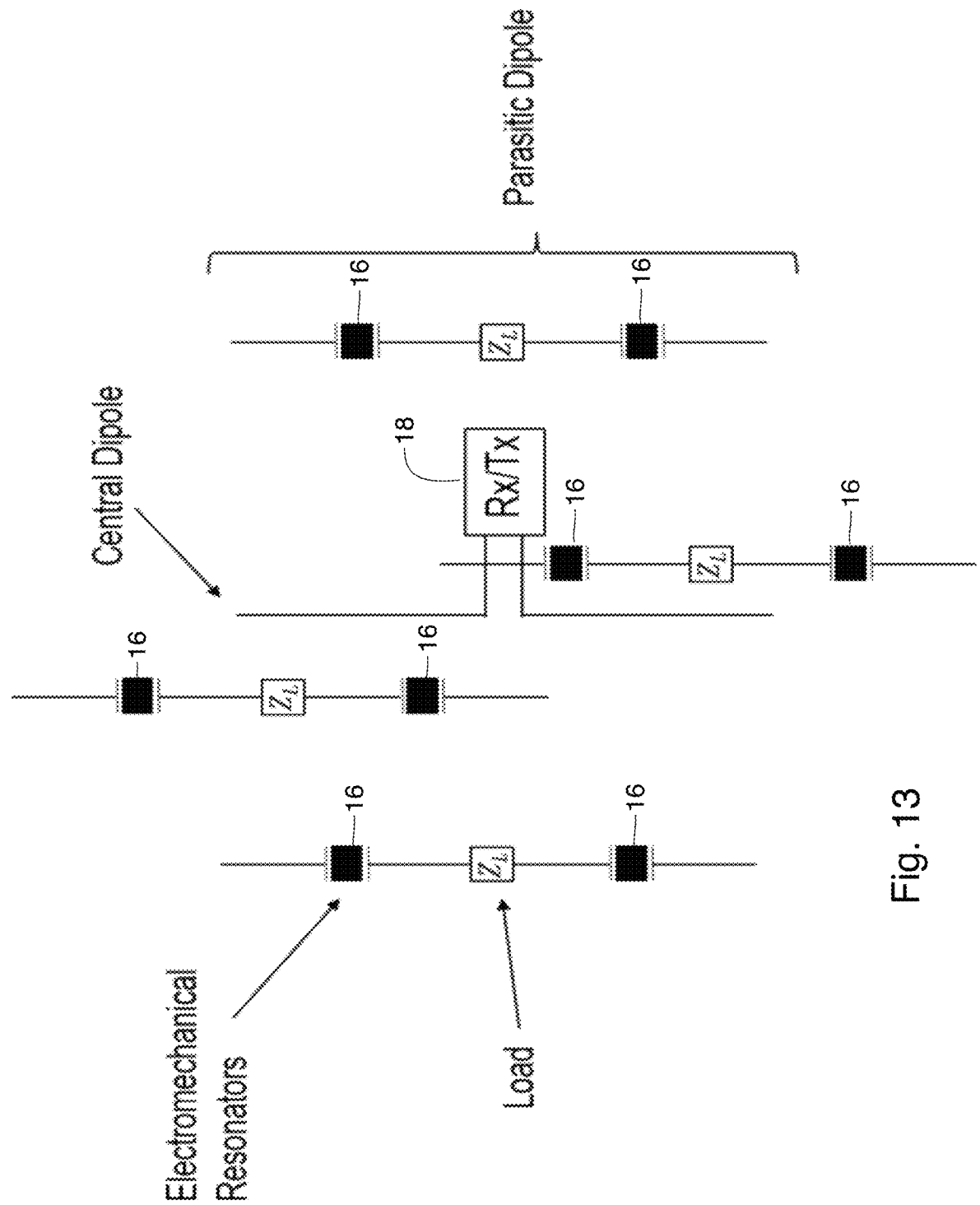
FIG. 13 depicts an embodiment of this invention wherein a central dipole or monopole antenna surrounded by multiple parasitic dipole or monopole antennas spaced<λ/4 away from the central element.

In a final embodiment of this invention comprises a central dipole or monopole antenna surrounded by multiple parasitic dipole or monopole antennas spaced<λ/4 away from the central element (see FIG. 13). In the case of the dipole array both the central antenna element and the parasitic elements are comprised of two thin metallic rods or metal sheets. In the case of the, monopole array both the central antenna element and the parasitic elements are comprised of a single metallic rod or metal sheet placed over a ground plane. In both the dipole and monopole configurations, the central element is connected to a transmitter, receiver, or transceiver 18, whereas the surrounding parasitic dipoles are connected to some load value $Z_L$ which can be tuned using known methods to form directive beams in the radiation pattern of the array. Each element is broken at one or multiple locations along their length. Electromechanical resonators 16 tuned to present a positive reactance are placed across each break to cancel the negative reactance of the antenna as well as to alter the current distribution on the antenna.

The antenna elements are often described as being "thin". Thinness can be a desirable attribute if the antenna element telescopes, for example, so that it can be pulled out of a hand held communication apparatus in a telescoping manner. The same is true for the diameter of the antenna element. Telescoping antenna elements for hand held communication apparatus are often only around ¼ inch in diameter. But antenna elements which are thicker and/or have a larger diameter can be superior from a purely electrical performance perspective and/or from a mechanical suitability perspective. So in the context of the present invention, there is no need for the antenna elements to be thin or thick walled or of a small or large diameter. The antenna elements, as a practical matter, are preferably of circular cross section, but they can be of any suitable cross section. The antenna elements, as a practical matter, are made of metal.

This concludes the description of embodiments of the present invention. The foregoing description of these embodiments and the methods of making same has been presented for the purposes of illustration and description. It is not intended to be exhaustive or to limit the invention to the precise form or methods disclosed. Many modifications and variations are possible in light of the above teachings. It is intended that the scope of the invention be limited not by this detailed description, but rather by the claims appended hereto.

What is claimed is:

1. A dipole antenna having two arms, wherein each arm has at least one opening, which opening provides at least a first portion and a second portion of the arm in which said at least one opening is located, wherein said at least one opening separates the first portion from the second portion at some point along the length of said arm, each opening being occupied by at least one electromechanical resonator connecting the first portion and the second portion of said arm.

2. The dipole antenna of claim 1 wherein the opening in each arm is electrically occupied by said at least one electromechanical resonator.

3. The dipole antenna of claim 1 wherein the opening in each arm is also physically occupied by said at least one electromechanical resonator.

4. The dipole antenna of claim 1 wherein each arm has a plurality of openings therein, each one of the plurality of openings being occupied by at least one electromechanical resonator connected to portions of the arm in which it is located.

5. The dipole antenna of claim 4 wherein each one of the electromechanical resonators presents a positive reactance across the opening in the arm in which it is located.

6. An antenna comprising an array of dipole antenna elements, each of the dipole antenna elements having two arms, each with at least one opening therein separating the arm into a first portion and a second portion at some point along the length of the arm, each said opening being occupied by an electromechanical resonator, at least one of said dipole antenna elements in said array being adapted to be electrically excited by a radio transmitter, the remaining dipole antenna elements in said array surrounding, at least in part, said at least one of said dipole antenna elements in said array, each of the electromechanical resonators in said openings presenting a positive reactance to those portions of the dipole antenna element on either side of said opening at an intended frequencies of operation of the antenna.

7. An antenna having at least one active or driven element, the at least one active or driven element having at least one opening therein that separates the active or driven element into a first portion and a second portion of the active or driven element at some point along the length of the active or driven element, the at least one opening being occupied by at least one electromechanical resonator connected to the first portion and the second portion of the active or driven element.

8. The antenna of claim 7 wherein the opening in the at least one active or driven element is electrically occupied by said at least one electromechanical resonator.

9. The antenna of claim 7 wherein the opening in the at least one active or driven element is also physically occupied by said at least one electromechanical resonator.

10. The antenna of claim 7 wherein the at least one active or driven element has a plurality of openings therein, each one of the plurality of openings being occupied by at least one electromechanical resonator connected to portions of the arm in which it is located.

11. The antenna of claim 10 wherein each of the electromechanical resonators presents a positive reactance across the opening in the arm in which it is located.

12. An antenna comprising an array of antenna elements, each of the antenna elements having at least one active or driven element with at least one opening therein, said at least one opening separating the at least one active or driven element into a first portion and a second portion at some point along the length of the at least one active or driven element; said at least one opening being occupied by at least one electromechanical resonator, at least one antenna element in said array being adapted to be electrically excited by a radio transmitter, the at least one electromechanical resonator presenting a positive reactance to those portions of the antenna element on either side of said opening at intended frequencies of operation of the antenna.

13. An antenna system comprising:
   a. at least one active or driven element having a first end for connection to a radio receiver, transmitter or transceiver,
   b. at least one parasitic element which is, in use, coupled electromagnetically with the active or driven element, at least one opening separating the at least one parasitic element into a first portion and a second portion at some point along the length of the at least one parasitic element, and
   c. at least one electromechanical resonator connected in series between said first portion of said at least one parasitic element and said second portion of said at least one parasitic element.

14. The antenna system of claim 13 wherein the at least one electromechanical resonator comprises at least one piezoelectric crystal type electromechanical resonator.

15. The antenna system of claim 13 wherein at least one active or driven element comprises arms a Yagi-Uda type dipole antenna and wherein the at least one parasitic element forms parasitic arms of said Yagi-Uda type dipole antenna.

* * * * *